United States Patent [19]

Yates et al.

[11] Patent Number: 4,921,589

[45] Date of Patent: May 1, 1990

[54] POLYSILOXANE BOUND PHOTOSENSITIZER FOR PRODUCING SINGLET OXYGEN

[75] Inventors: Stephen F. Yates, Arlington Heights, Ill.; Mary L. Good, Convent Station, N.J.; Inara M. Brubaker, Des Plaines, Ill.

[73] Assignee: Allied-Signal Inc., Morris Township, Morris County, N.J.

[21] Appl. No.: 287,315

[22] Filed: Dec. 20, 1988

[51] Int. Cl.$^5$ ............ B01J 19/08; B01J 31/00; B05D 3/02

[52] U.S. Cl. .................. 204/157.5; 522/904; 204/157.49; 204/157.76; 204/158.21; 204/158.2; 204/157.15; 502/158; 502/159; 502/162; 502/168; 502/167; 427/387; 427/221; 427/216; 427/389.7; 427/393.6; 528/9; 528/10

[58] Field of Search .......... 502/158, 159, 171, 172, 502/162, 168, 167; 204/157.15, 157.5, 157.49, 157.76, 158.21, 158.2; 427/387, 221, 216, 389.7, 393.6; 522/904, 6, 65, 68; 528/9, 10

[56] References Cited

U.S. PATENT DOCUMENTS

| | | | |
|---|---|---|---|
| 3,951,797 | 4/1976 | Seely | 204/158.21 |
| 4,104,204 | 8/1978 | Williams | 522/904 |
| 4,290,869 | 9/1981 | Pigeon | 522/99 |
| 4,315,998 | 2/1982 | Neckers et al. | 525/332 |
| 4,391,963 | 7/1983 | Shirahata | 522/904 |
| 4,435,259 | 3/1984 | Chang | 522/99 |
| 4,436,715 | 3/1984 | Schapp | 204/157.5 |
| 4,534,838 | 8/1985 | Lin | 522/904 |
| 4,536,265 | 8/1985 | Fabrizio | 522/904 |
| 4,579,837 | 4/1986 | Busch | 502/158 |
| 4,666,953 | 5/1987 | Klemarczyk | 522/904 |
| 4,849,076 | 7/1989 | Neckers | 204/157.15 |

FOREIGN PATENT DOCUMENTS

| | | | |
|---|---|---|---|
| 1044639 | 12/1978 | Canada | 204/91.01 |
| 1054971 | 5/1979 | Canada | 204/91.22 |

OTHER PUBLICATIONS

N. J. Turro, Modern Molecular Photochemistry, Benjamin/Cummings Publishing Co. Inc, pp. 309–311 (1978).

Primary Examiner—John F. Niebling
Assistant Examiner—Ben C. Hsing
Attorney, Agent, or Firm—Frank S. Molinaro; Harold N. Wells; Gerard P. Rooney

[57] ABSTRACT

This invention relates to a photosensitizer which is bound to a polysiloxane polymer, a method of preparing the bound photosensitizer and a process for using the bound photosensitizer. The photosensitizers which may be used in the invention include rose bengal, rhodamine B, acridine orange, methylene blue and zinc phthalocyanine. The photosensitizer is attached to the polysiloxane by reacting a hydroxyl or vinyl group on the photosensitizer with a hydrogen on the polyhydrosiloxane, thereby binding the photosensitizer into the polymer network. Finally, the bound photosensitizer may be used to oxidize undesirable oxidizable compounds present in a hydrocarbon or aqueous fraction. One specific example is the sweetening of kerosene which involves oxidizing the mercaptans contained in the kerosene.

28 Claims, No Drawings

POLYSILOXANE BOUND PHOTOSENSITIZER FOR PRODUCING SINGLET OXYGEN

BACKGROUND OF THE INVENTION

Diatomic oxygen in its ground state is a paramagnetic molecule because it has a triplet ground state. Electronic excitation can produce either of two excited states, both of which are diamagnetic singlet states. The lower excited state, $^1\Delta_g$, has an energy of 22.5 kcal/mol above the ground state while the higher excited state, $^1\Sigma_g$, has an energy of 37.5 kcal/mol. Only the lower excited state has a long enough lifetime to be chemically active in solution and is normally referred to as "singlet oxygen", $^1O_2$.

Singlet oxygen has been found to be a much stronger oxidizing agent than ground state molecular oxygen. Singlet oxygen has a calculated reduction potential of 1.7 V which makes it a better oxidizing agent (in non-acidic conditions) than ozone, hydrogen peroxide, sodium hypochlorite and chlorine dioxide. Thus, singlet oxygen can be used in a number of oxidation reactions such as synthesis of organic compounds, removal of humic acid from water, removal of phenols from waste streams, removal of cyanide from electroplating waste, oxidation of mercaptans in hydrocarbon streams and destruction of bacteria in various streams.

The usual method of generating singlet oxygen is by energy transfer from light and a photosensitizer. The role of the photosensitizer is to absorb the light and transfer its energy to the oxygen thereby forming singlet oxygen. The mechanism for producing singlet oxygen is well known in the art and the photosensitizers which can be used to produce singlet oxygen are also well known. Illustrative of these photosensitizers are rose bengal, methylene blue, eosin, chlorophyll, fluorescein, acridine orange, porphyrins, phthalocyanines, etc.

The prior art teaches that these photosensitizers are usually used in a homogeneous phase; that is, the photosensitizer is dissolved in the reaction medium. This has the disadvantage that the photosensitizer must be separated from the reaction product. Even if separation is possible, complete separation is usually not achieved which means that fresh photosensitizer must be added to the fresh reaction medium. Since photosensitizer are expensive, the loss of photosensitizer may make the overall process uneconomical. Moreover, the effective concentration of photosensitizer which can be employed is limited not only owing to the increased difficulty of separating of the photosensitizer from the products, but also owing to the fact that at higher concentrations the photosensitizers tend to form dimers and higher aggregates which reduce their effectiveness as photosensitizers.

One way to solve these problems is to carry out the photooxidation in a heterogeneous phase. Such a system is disclosed in U.S. Pat. No. 4,315,998 (see also Canadian Pat. Nos. 1,044,639 and 1,054,971). The '998 patent discloses chemically binding the photosensitizer to a polymeric material. The polymer used in the '998 patent is a modified crosslinked polystyrene polymer to which the photosensitizer is bound through a nucleophilic displacement reaction. However, crosslinked polystyrene has several disadvantages. One disadvantage is that crosslinked polystyrene is not transparent and thus only a portion of the photosensitizer is exposed to light. For example, if the crosslinked polystyrene is in the shape of spheres which are placed in a column, only the outside spheres will be exposed to light, while the interior spheres will not. Therefore, reaction will only take place on the exterior of the column.

Thus, there is a need for a polymer bound photosensitizer which utilizes all the available photosensitizers. Applicants have developed such a photosensitizer. Applicants' polymer bound photosensitizer consists of a polysiloxane polymer to which is bound a photosensitizer and which is supported on a solid substrate. The photosensitizer is bound to the polysiloxane by reacting a hydroxyl or vinyl group on the photosensitizer with a hydrogen on a polyhydrosiloxane polymer, thereby attaching the photosensitizer into the polymer network.

Comparing the polysiloxane bound photosensitizer of the present invention with the polystyrene bound photosensitizer of the prior art shows several striking differences. First, the polymer of the instant invention is a silicon containing polymer, whereas the polymer of the '998 patent does not contain any silicon. Second, the polysiloxane polymer is clear and lets light through whereas the crosslinked polystyrene of the '998 patent is opaque and does not let light through. Finally, the methods of attaching the photosensitizer to the polymer are different. In the present case, the photosensitizer is attached to the polymer either through the addition of hydrogen to a vinyl group or reacting a hydroxyl group with hydrogen, neither of which is a nucleophilic displacement reaction as disclosed in the '998 patent. For all these reasons, applicants' invention represents a significant improvement in the art.

Not only have applicants found a new way to bind a photosensitizer to a polymer, applicants have also found a new use for the polysiloxane bound photosensitizer. This new use involves oxidizing mercaptans which are present in various hydrocarbon streams with singlet oxygen generated from light, oxygen and a polysiloxane bound photosensitizer. The standard way of treating a hydrocarbon stream containing mercaptans is to first contact the hydrocarbon fraction with an aqueous alkaline solution, thereby transferring the mercaptans into the aqueous phase, followed by oxidation of the mercaptans with oxygen in the presence of a metal phthalocyanine catalyst. This process has the disadvantage in that it forms a waste alkaline stream which must be disposed. By using photooxidation, the disposal associated with the use of an alkaline solution are eliminated. Thus, applicants' invention solves an important environmental problem related to the disposal of the alkaline solution.

SUMMARY OF THE INVENTION

This invention relates to a supported photosensitizer coating, a method of preparing the supported photosensitizer coating and a method of using the supported photosensitizer coating.

Accordingly, one embodiment of the invention is a supported photosensitizer coating comprising a network of polysiloxanes crosslinked by a copolymer having bound to it a photosensitizer supported on a solid substrate, the polysiloxanes having the formula,

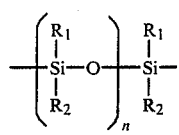

one or both ends of the polysiloxane covalently bound at the position designated X of a copolymer having the formula

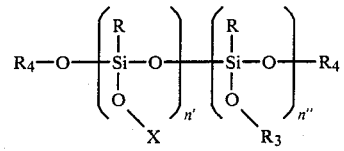

or the formula

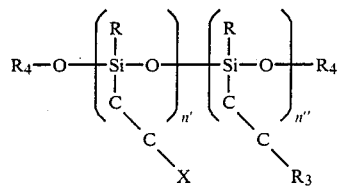

where R, $R_1$, $R_2$ and $R_4$ are individually an alkyl, aryl, alkaryl, or aralkyl group having from 1 to about 20 carbon atoms, n is an integer from 200 to about 2,000, $R_3$ is a photosensitizer and n' and n'' are integers each having a value of at least one and the sum of n' and n'' being an integer from about 20 to about 100.

Another embodiment of the invention is a method of preparing a supported photosensitizer coating comprising (a) applying a coating to a substrate, the coating comprising (i) a polysiloxane solution, the polysiloxane having the formula

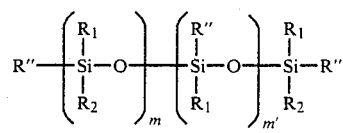

OR

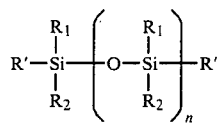

where n is an integer from 200 to about 2,000, $R_1$ and $R_2$ are individually an alkyl, aryl, alkaryl, or aralkyl group having from 1 to about 20 carbon atoms and R' is a hydroxyl group, R'' is a vinyl group and m and m' are integers each individually having a value of at least one and the sum of m and m' being an integer from about 200 to about 2,000, (ii) a polyhydrosiloxane solution, the polyhydrosiloxane having the formula,

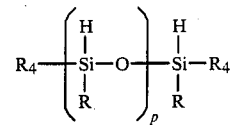

where p is an integer from 20 to about 100 and R and $R_4$ are individually an alkyl, aryl, alkaryl, or aralkyl group having from 1 to about 20 carbon atoms, (iii) a photosensitizer solution, the photosensitizer containing a hydroxyl or vinyl group, and (iv) a polymerization catalyst;

(b) polymerizing the coating at a temperature and for a time sufficient to crosslink the polymer and bind the photosensitizer to the polysiloxane polymer.

Thus, a specific embodiment of the invention is applying a coating to a glass plate, the coating comprising a mixture of a methyl ethyl ketone solution of a hydroxy-terminated polydimethylsiloxane, a methanol solution of rose bengal and a methyl ethyl ketone solution of polyhydromethylsiloxane and tin octoate, and polymerizing the coating at a temperature of about 110° C. for about 2 minutes.

Yet another embodiment of the invention is a method of oxidizing undesirable oxidizable compounds present in a hydrocarbon or aqueous fraction comprising contacting the hydrocarbon or aqueous fraction with a polysiloxane bound photosensitizer in the presence of molecular oxygen and light, thereby oxidizing the oxidizable compound by reacting the oxidizable compound with singlet oxygen which is generated from molecular oxygen by energy transfer from the light and the polysiloxane bound photosensitizer, and producing a treated hydrocarbon or aqueous fraction.

Yet another specific embodiment is a method of oxidizing mercaptans present in a hydrocarbon fraction comprising contacting the hydrocarbon fraction with rose bengal bound to a polysiloxane polymer in the presence of molecular oxygen and light, thereby oxidizing the mercaptans to disulfides and producing a sweet hydrocarbon fraction.

Other objects and embodiments will become more apparent after a more detailed description of the invention.

DETAILED DESCRIPTION OF THE INVENTION

As indicated, the present invention relates to a supported photosensitizer coating, a method of preparing the supported photosensitizer coating and a method of oxidizing oxidizable compounds using the supported photosensitizer coating.

Accordingly, the essential features of the present invention are a polysiloxane polymer, a photosensitizer, and a support. A photosensitizer is a compound which promotes a chemical reaction by absorbing light and transferring it to another compound which carries out the reaction. The criterion used to choose a photosensitizer is that the excited state of the photosensitizer be at a higher energy than the singlet oxygen energy state. For a more complete explanation of energy-transfer mechanisms see N. J. Turro, *Modern Molecular Photochemistry*, Benjamin/Cummings Publishing Co. Inc., p 309–311 (1978). Illustrative of the photosensitizers which can be used in the present invention are rose bengal, rhodamine B, acridine orange, fluorescein, methylene blue, metal phthalocyanines, pyrene, and zinc tetraphenylporphyrin. Illustrative of metal phthalocyanines which can be used are zinc phthalocyanine, magnesium phthalocyanine, calcium phthalocyanine, scandium phthalocyanine and aluminum phthalocyanine. It is also necessary that the photosensitizer contain a hydroxyl group or a vinyl group. Photosensitizers enumerated above that do not naturally contain such a group can be modified to attach such a group. Thus, it is assumed that when a photosensitizer is mentioned it is to be understood that the photosensitizer either naturally contains or has been modified to contain a hydroxyl or vinyl group.

The photosensitizer of this invention is attached to the polysiloxane either through an O—Si bond or a C—Si bond. These polysiloxane bound photosensitizers have the formula,

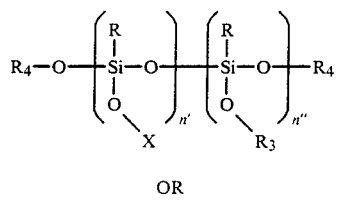

OR

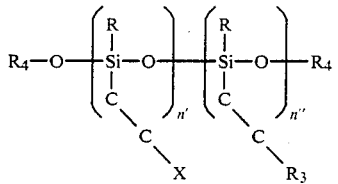

where R, $R_1$, $R_2$ and $R_4$ are individually an alkyl, aryl, alkaryl or aralkyl group having from 1 to about 20 carbon atoms, n is an integer from 200 to about 2,000, $R_3$ is a photosensitizer and n' and n" are integers each having a value of at least one and the sum of n' and n" being an integer from about 20 to about 100. The above polymers will be referred to herein as copolymers. In order to deposit these bound photosensitizers onto a solid substrate, it is necessary that the coating also contain a polymer having the formula,

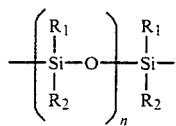
(I)

The purpose of the polysiloxanes of formula I is to give a durable cohesive coating on the substrate. The polysiloxanes of formula I are bound at one or both ends to the photosensitizer containing copolymers at the position marked X. Finally, the support is a solid substrate selected from the group consisting of glass hollow fibers, glass, ceramic or metal plates, spheres, rings, helices and small tubes.

Another embodiment of this invention is a method of preparing a supported photosensitizer coating. The first step involves applying a coating containing the photosensitizer and polysiloxane polymers to the support which is a solid substrate. The coating in turn is prepared by reacting (i) a polysiloxane solution, the polysiloxane having the formula

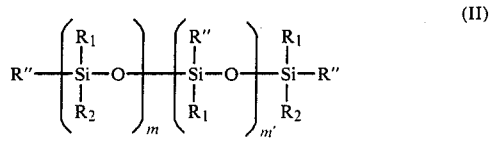
(II)

OR

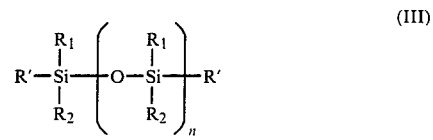
(III)

where n is an integer from 200 to about 2,000, $R_1$ and $R_2$ are individually an alkyl, aryl, alkaryl, or aralkyl group having from 1 to about 20 carbon atoms, R' is a hydroxyl group, R" is a vinyl group and m and m' are integers each having a value of at least one and the sum of m and m' being an integer from about 200 to about 2,000.

(ii) a polyhydrosiloxane solution the polyhydrosiloxane having the formula

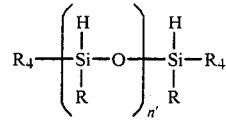

where n' is an integer from 20 to about 100 and R and $R_4$ are individually an alkyl, aryl, alkaryl or aralkyl group having from 1 to about 20 carbon atoms.

(iii) a photosensitizer solution and
(iv) a catalyst.

Illustrative examples of the polysiloxane which can be used are hydroxy-terminated polydimethylsiloxane, hydroxy-terminated polymethylhexylsiloxane, hydroxy-terminated polydiethylsiloxane, vinyl-terminated polydioctylsiloxane, vinyl-terminated polymethylphenylsiloxane, vinyl-terminated polydimethylsiloxane, copolymer of vinylmethylsiloxane and dimethylsiloxane, etc. Illustrative examples of the polyhydrosiloxane are polyhydromethylsiloxane, polyhydroethylsiloxane, polyhydroheptylsiloxane and polyhydrophenylsiloxane. The polyhydrosiloxane is used as a crosslinker in order to obtain a crosslinked network of polysiloxanes.

The criterion required of the solvent used to prepare the solutions is that the polysiloxane, polyhydrosiloxane and photosensitizer be soluble in the solvent. Illustrative of the solvents which can be used to prepare solutions of the photosensitizers are methanol, ethanol, acetonitrile while ketones such as methyl ethyl ketone can be used to prepare solutions of the siloxanes.

The polymerization reaction (which takes place after the coating is applied to the substrate) is carried out in the presence of a catalyst. The catalyst may be chosen from those catalysts that are well known in the art. Thus, when the polysiloxane has formula III, i.e., contains a hydroxyl group (the photosensitizer must also contain a hydroxyl group), illustrative examples of the catalyst which can be used are: tin octoate, dibutyltin dilaurate, zinc octanoate, tin octanoate and zinc hexanoate. When the polysiloxane has formula II, i.e., contains a vinyl group (the photosensitizer must also contain a vinyl group), illustrative examples of the catalyst which can be used are chloroplatinic acid, platinum divinyltetramethyldisiloxane, platinum carbonyl dichloride and tris(triphenylphosphine) platinum. The catalyst can be added either in a heterogeneous or homogeneous phase, although not with equivalent results. A homogeneous phase is preferred. The catalyst is present in amounts ranging from about 20 to about 8,000 ppm as the metal in the mixture.

The resultant mixture of the necessary components is now applied to a solid substrate. Examples of solid substrates are glass hollow fibers, glass, ceramic or metal rings, helices, spheres, plates, or small tubes. Glass spheres, plates and helices are preferred. Once the mixture is applied to the desired substrate, polymerization may be effected at ambient temperature or elevated temperatures. Generally it is best to carry out the polymerization reaction at a temperature of about 70° to about 150° C. The amount of time required to effect the polymerization is generally from about 1 to about 10 minutes.

As pointed out, the polymerization reaction involves reacting a hydroxyl group or a vinyl group on the photosensitizer with a hydrogen on the polyhydrosiloxane polymer. Therefore it is necessary that the desired photosensitizer contain a hydroxyl or vinyl group. For example, rose bengal naturally contains a hydroxyl group but can also be modified to contain a vinyl group. This can be done by treating rose bengal with allyl bromide to give the allyl ester of rose bengal. Similarly, a vinyl group may also be introduced into the structure of azure B, to make an analog of methylene blue.

If a metal phthalocyanine is the desired photosensitizer then a vinyl group may be attached to the phthalocyanine by first reacting the phthalocyanine with chlorosulfonic acid, followed by treatment with thionyl chloride to give the phthalocyanine sulfonyl chloride. The sulfonyl chloride derivative is now reacted with diallylamine to give a phthalocyanine-N,N-diallylsulfonamide, which can be reacted with a polyhydrosiloxane. Thus, whereever phthalocyanine is used it is meant that it has been modified to contain a vinyl or hydroxyl group.

The polysiloxane bound photosensitizer can be used to oxidize undesirable oxidizable compounds present in a hydrocarbon or aqueous fraction. Examples of the types of hydrocarbon or aqueous fractions which can be treated and the undesirable compound contained therein which will be oxidized are: removal of humic acid from water, removal of phenols from organic waste streams, cyanide removal from electroplating waste, destruction of bacteria in aqueous streams, and oxidation of mercaptans in hydrocarbon fractions. The treatment process involves contacting the hydrocarbon or aqueous fraction with the polysiloxane bound photosensitizer in the presence of oxygen and light. The oxygen may be added in any convenient way such as by sparging air into the system. The wavelength of the light used is also important and should be chosen so that the range of the wavelength of the light includes the wavelength of maximum absorbance for the photosensitizer. In general the wavelength of the light should be in the range of about 350 to about 800 nm. For example, when rose bengal is the photosensitizer a sodium arc lamp is preferred because it emits a considerable amount of radiant power at wavelengths between about 560 to about 620 nanometers. This range of wavelength encompasses the absorbance maximum of rose bengal which occurs at 568 nanometers.

The photooxidation process described above can be carried out either in a batch mode or a continuous flow mode. When a batch mode is desired, it is desirable that the fraction to be treated be contacted with the oxygen and polysiloxane bound photosensitizer for a time of about 30 to about 450 min. Since the singlet oxygen which is generated by the interaction of the photosensitizer and oxygen is short lived (4–4,000 $\mu$sec.), it is also desirable to use a mixing method to ensure complete contact between the singlet oxygen generated at the polymer surface and the compound to be oxidized. For example, an annular reactor may be used and the hydrocarbon recirculated for a time sufficient to obtain the desired conversion.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

Rose bengal was attached to polysiloxane by the following procedure. In a beaker, 10 g of hydroxy-terminated polydimethylsiloxane was dissolved in 6.5 g of methyl ethyl ketone. To this there was added 0.5 g of a 4.2% solution of rose bengal in methanol, followed by 0.2 g of polyhydromethylsiloxane and then 0.15 g of a 50% tin octoate in toluene solution. The initial red solution became slightly darker red when the tin octoate solution was added.

The solution was allowed to stand for 10–15 minutes before being cast on a glass plate by applying about 2 mL of the solution to one side of the plate and drawing a membrane casting knife set at 3 mils across the plate. The coated plate was then cured in an oven at 110° C. for 2 minutes. After the plate was cured, the color of the coating returned to the original red color of the solution.

EXAMPLE II

This example presents a method of binding rose bengal to a polysiloxane polymer by using an allyl derivative of rose bengal.

A round bottom flask which was equipped with a stirbar, condenser and nitrogen line was flushed with nitrogen. To this there were added 2.0 g of rose bengal and 40 mL of water. While this solution was stirred, there were added 40 mL of acetone and 3.5 mL of allyl bromide. The resultant mixture was heated to 50° C. and stirred at that temperature overnight. During this time, the dark red solution became a heterogeneous lighter red solution. After cooling to room temperature the mixture was suction filtered and 1.98 g of solid rose bengal allyl ester was obtained.

In a small beaker 6.85 g of vinyl-terminated polydimethylsiloxane (Dow Corning Syl-off 7046 which also contained 70 ppm of a platinum catalyst) was dissolved in 10.25 g of xylenes. To this there was added 0.57 g of a 4% solution of rose bengal allyl ester (as obtained above) in methyl ethyl ketone. Finally, 0.36 g of a 10% solution of polyhydromethylsiloxane in xylenes was added and briefly stirred. The resultant polysiloxane bound rose bengal solution was cast on an 8"×10" acid washed glass plate with a #36 Consler rod. The coating was then cured at 130° C. for 1 minute.

EXAMPLE III

This example presents a method of binding zinc phthalocyanine to a polysiloxane polymer. A three neck round bottom flask was equipped with a condenser and stirbar. A "T" style nitrogen inlet adapter was used to blow nitrogen across the outlet of the condenser and then to a bubbler filled with water. To this flask were added 2.0 g of zinc phthalocyanine and, cautiously, 4.8 mL of chlorosulfonic acid. The acid reacted with the solid dye to provide a dark green-black paste, and white fumes were emitted which passed the condenser and were absorbed by the water trap. This mixture was heated to 120° C. for 24 hrs.

After cooling to room temperature, 4 mL of thionyl chloride was added, dissolving the sludge to give a black solution. This solution was heated with stirring at 60° C. for an additional 24 hrs. The solution was then cooled by immersing the flask in an ice/water slurry, and water was added cautiously. The reaction with water was initially very exothermic, with evolution of white fumes. Once no further reaction was observed when water was added, the reaction mixture was filtered with suction to give 2.21 g of a dark purple solid. The dark purple solid was identified as a mixture of zinc phthalocyanine sulfonyl chlorides.

The crude zinc phthalocyanine sulfonyl chloride was now converted to zinc N,N-diallylphthalocyaninesulfonamides as follows:

A round bottom flask equipped with a condenser, nitrogen line, and stirbar was flushed with nitrogen. To this there were added 1.03 g of crude zinc phthalocyaninesulfonyl chloride, and 10 mL of N,N-dimethylformamide. On stirring, the chloride dissolved completely in the solvent. To the reaction mixture there was then added 0.86 g of N,N-diallylamine. The mixture was stirred at room temperature for 24 hours.

The crude reaction product was applied to a 2×30 cm column of silica gel wet packed with methylene chloride. Elution with methylene chloride allowed the isolation of an intensely blue green material in the first 3-5 column volumes. Stripping with ether did not remove any of the additional colored material on the column. Rotary evaporation yielded a mixture of zinc N,N-diallylphthalocyaninesulfonamide.

The zinc N,N-diallylphthalocyanine was bound to the polysiloxane polymer as follows.

In a beaker equipped with a stirrer there were added 10 g of vinyl-terminated polydimethylsiloxane (Dow Corning Syl-off 7146), 50 g of methyl ethyl ketone, 4 g of a 2.75% solution of zinc N,N-diallylphthalocyaninesulfonamide, 0.1 g of polyhydromethylsiloxane and 0.05 g of platinum divinyltetramethyldisiloxane. The mixture was briefly stirred.

The above zinc phthalocyanine polymer bound solution was coated onto glass beads as follows. A 300 g sample of pyrex beads was washed with 3M sulfuric acid and dried in an oven. These beads were then dipped into a solution of 1% titanium isopropoxide in hexane for 1 minute, separated from the solution and dried at 120° C. for 20 seconds. The beads were cooled and then dipped into the solution prepared in the above paragraph. After dipping, the coated beads were cured at 120° C. for 5 minutes and then allowed to stand at room temperature for 72 hours.

EXAMPLE IV

Two glass plates (5 cm×2.75 cm) were coated as described in Example II and placed in a 600 mL beaker. To this beaker was added 510 mL kerosene containing 361 ppm of mercaptans. Air was sparged through this solution and it was irradiated with the light from a Lucalox 400 watt sodium arc lamp (General Electric). The Table below shows the reduction of mercaptan concentration as a function of irradiation time.

TABLE

| Time (min.) | Mercaptan Concentration (ppm) |
|---|---|
| 0 | 361 |
| 15 | 335 |
| 55 | 324 |
| 150 | 312 |
| 275 | 341 |
| 720 | 258 |

Thus, having described the invention in detail, it will be understood by those skilled in the art that certain variations and modifications may be made without departing from the spirit and scope of the invention as defined herein and in the appended claims.

We claim as our invention:

1. A supported photosensitizer coating comprising a network of polysiloxanes crosslinked by a copolymer having bound to it a photosensitizer supported on a solid substrate, the polysiloxanes having the formula

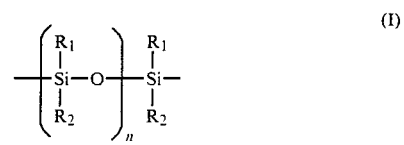

one or both ends of the polysiloxane covalently bound at the position designated X of a copolymer having the formula,

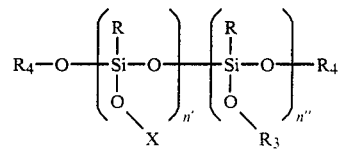

or the formula

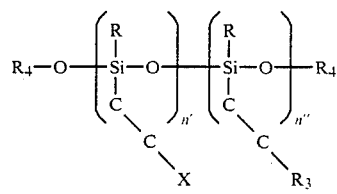

where R, $R_1$, $R_2$ and $R_4$ are individually an alkyl, aryl, alkaryl, or aralkyl group having from 1 to about 20 carbon atoms, n is an integer from 200 to about 2000, $R_3$ is a photosensitizer and n' and n" are integers each having a value of at least one and the sum of n' and n" being an integer from about 20 to about 100.

2. The supported photosensitizer coating of claim 1 where the photosensitizer is selected from the group consisting of rose bengal, acridine orange, methylene blue, rhodamine B, fluorescein, zinc phthalocyanine, magnesium phthalocyanine and zinc tetraphenyl porphyrin.

3. The supported photosensitizer coating of claim 1 where the photosensitizer is rose bengal.

4. The supported photosensitizer coating of claim 1 where $R_1$ and $R_2$ are methyl groups.

5. The supported photosensitizer coating of claim 1 where $R_1$ is a methyl group and $R_2$ is an octyl group.

6. The supported photosensitizer coating of claim 1 where R is a methyl group.

7. The supported photosensitizer coating of claim 1 where R is an ethyl group.

8. The supported photosensitizer of claim 1 where the substrate is selected from the group consisting of glass hollow fibers, glass, ceramic or metal plates, spheres, rings, helices and small tubes.

9. A method of preparing a supported photosensitizer coating comprising
(a) applying a coating to a substrate, the coating comprising (i) a polysiloxane solution, the polysiloxane having the formula

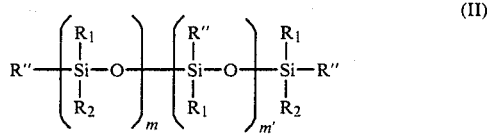

(II)

OR

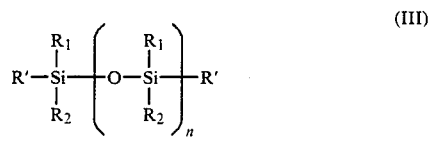

(III)

where n is an integer from 200 to about 2,000, $R_1$ and $R_2$ are individually an alkyl, aryl, alkaryl, or aralkyl group having from 1 to about 20 carbon atoms, R' is a hydroxyl group, R'' is a vinyl group and m and m' are integers each having a value of at least one and the sum of m and m' being an integer from 200 to about 2,000, (ii) a polyhydrosiloxane solution, the polyhydrosiloxane having the formula

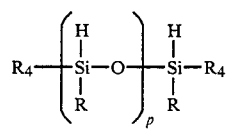

where p is an integer from 20 to about 100 and R and $R_4$ are individually an alkyl, aryl, alkaryl or aralkyl group having from 1 to about 20 carbon atoms; (iii) a photosensitizer solution, the photosensitizer containing a hydroxyl or vinyl group; and
(iv) a polymerization catalyst;
(b) polymerizing the coating at a temperature and for a time sufficient to crosslink the polysiloxane polymer and bind the photosensitizer to the polysiloxane polymer.

10. The method of claim 9 where the photosensitizer is selected from the group consisting of rose bengal, acridine orange, methylene blue, rhodamine B, fluorescein, zinc phthalocyanine, magnesium phthalocyanine and zinc tetraphenyl porphyrin.

11. The method of claim 9 where the photosensitizer is rose bengal.

12. The method of claim 9 where the polysiloxane is polydimethylsiloxane.

13. The method of claim 9 where the polysiloxane is polydioctylsiloxane.

14. The method of claim 9 where the polyhydrosiloxane is polyhydromethylsiloxane.

15. The method of claim 9 where the polyhydrosiloxane is polyhydroethylsiloxane.

16. The method of claim 9 where the catalyst is a platinum catalyst when the polysiloxane has formula II.

17. The method of claim 9 where the catalyst is a compound of a metal selected from the group consisting of tin, zinc and iron when the polysiloxane has formula III.

18. The method of claim 9 where the substrate is selected from the group consisting of glass hollow fibers, glass, ceramic or metal plates, spheres, rings, helices and small tubes.

19. A method of oxidizing undesirable oxidizable compounds present in a hydrocarbon or aqueous fraction comprising contacting the hydrocarbon or aqueous fraction with a polysiloxane bound photosensitizer in the presence of molecular oxygen and light, thereby oxidizing the oxidizable compound by reacting the oxidizable compound with singlet oxygen which is generated from molecular oxygen by energy transfer from the light and the polysiloxane bound photosensitizer and producing a treated hydrocarbon or aqueous fraction.

20. The method of claim 19 where the sensitizer is selected from the group consisting of rose bengal, acridine orange, methylene blue, rhodamine B, fluorescein, zinc phthalocyanine, magnesium phthalocyanine and zinc tetraphenyl porphyrin.

21. The method of claim 19 where the molecular oxygen is obtained from air.

22. The method of claim 19 further characterized in that the treating of the hydrocarbon or aqueous fraction is carried out in a batch process.

23. The method of claim 22 where the hydrocarbon or aqueous fraction, molecular oxygen, photosensitizer and light are contacted for a time of about 0.2 to about 10 hours.

24. The method of claim 19 further characterized in that the treating of the hydrocarbon or aqueous fraction is carried out in a continuous flow process.

25. The method of claim 24 where the hydrocarbon or aqueous fraction is flowed over the polysiloxane bound photosensitizer at a flow rate of about 0.1 to about 5 mL/min.

26. The method of claim 19 where the light has a wavelength from about 300 to about 800 nm.

27. The method of claim 19 where the oxidizable compound is a mercaptan and is present in a hydrocarbon fraction.

28. The method of claim 19 where the oxidizable compound is a phenol and is present in an aqueous fraction.

* * * * *